US007519451B2

(12) United States Patent
Hartnell et al.

(10) Patent No.: US 7,519,451 B2
(45) Date of Patent: Apr. 14, 2009

(54) APPARATUS AND METHODOLOGY OF DETECTING FULFILLMENT OF CUSTOMER VEND REQUEST

(75) Inventors: William Eric Hartnell, St. Charles, MO (US); David Boyd Whitten, St. Charles, MO (US)

(73) Assignee: Crane Co., Stamford, CT (US)

( * ) Notice: Subject to any disclaimer, the term of this patent is extended or adjusted under 35 U.S.C. 154(b) by 0 days.

(21) Appl. No.: 10/279,442

(22) Filed: Oct. 24, 2002

(65) Prior Publication Data

US 2003/0084959 A1 May 8, 2003

Related U.S. Application Data

(60) Provisional application No. 60/335,329, filed on Oct. 24, 2001.

(51) Int. Cl.
*G06F 17/00* (2006.01)

(52) U.S. Cl. ......................... 700/244; 700/232; 221/96; 222/544

(58) Field of Classification Search ................. 700/232, 700/244; 221/9 X, 12, 14 X, 21 X, 96; 222/55 X, 222/129.1; 141/1 X, 179 X
See application file for complete search history.

(56) References Cited

U.S. PATENT DOCUMENTS

| | | | | |
|---|---|---|---|---|
| 645,499 | A | 3/1900 | Vogel | |
| 2,571,283 | A * | 10/1951 | Nicholson | 141/174 |
| 2,590,736 | A | 3/1952 | Tandler et al. | |
| 2,900,521 | A | 8/1959 | Eames | |
| 3,025,406 | A | 3/1962 | Stewart et al. | |
| 3,235,738 | A | 2/1966 | Kress et al. | |
| 3,461,922 | A | 8/1969 | Nieuhaus et al. | |
| 3,704,396 | A | 11/1972 | Macdonald | |
| 3,723,737 | A | 3/1973 | Zeldman et al. | |
| 3,742,222 | A | 6/1973 | Endl | |
| 3,746,863 | A | 7/1973 | Pronovost | |
| 3,805,061 | A | 4/1974 | De Missimy et al. | |
| 3,889,118 | A | 6/1975 | Walker | |
| 3,901,366 | A | 8/1975 | Schuller et al. | |
| 4,108,333 | A | 8/1978 | Falk et al. | |
| 4,174,742 | A * | 11/1979 | Murphey | 141/11 |
| 4,252,250 | A | 2/1981 | Toth | |
| 4,266,124 | A | 5/1981 | Weber et al. | |
| 4,310,756 | A | 1/1982 | Sick et al. | |
| 4,359,147 | A | 11/1982 | Levasseur | |

(Continued)

FOREIGN PATENT DOCUMENTS

DE 200 06 317 U1 4/2000

(Continued)

OTHER PUBLICATIONS

"Wurlitzer," Deutsche Wurlitzer GmbH, A Division of Nelson Group of Companies, Sydney, Australia, 7 pages.

*Primary Examiner*—Gene Crawford
*Assistant Examiner*—Timothy R Waggoner

(57) ABSTRACT

The present invention provides for a vending system wherein a monitoring system verifies that a beverage product ordered by a vending customer is actually delivered through a delivery area to the customer. If the beverage product ordered is unavailable either because of an out of stock situation or a blockage of the delivery path for that product, the present invention allows the customer to request a refund or order a second product.

21 Claims, 9 Drawing Sheets

U.S. PATENT DOCUMENTS

| | | | | |
|---|---|---|---|---|
| 4,412,607 | A | 11/1983 | Collins et al. | |
| 4,480,764 | A * | 11/1984 | Takagi et al. | 221/11 |
| 4,494,675 | A | 1/1985 | Stutsman | |
| 4,573,606 | A | 3/1986 | Lewis et al. | |
| 4,590,975 | A | 5/1986 | Credle, Jr. | |
| 4,776,487 | A | 10/1988 | Kurosawa et al. | |
| 4,869,392 | A | 9/1989 | Moulding, Jr. et al. | |
| 4,871,054 | A | 10/1989 | Murray | |
| 4,888,532 | A | 12/1989 | Josson | |
| 4,912,316 | A | 3/1990 | Yamakawa | |
| 5,015,840 | A | 5/1991 | Blau | |
| 5,111,962 | A | 5/1992 | Oden | |
| 5,139,127 | A * | 8/1992 | Ficken et al. | 194/239 |
| 5,201,429 | A | 4/1993 | Hikosaka et al. | |
| 5,207,784 | A | 5/1993 | Schwartzendruber | |
| 5,229,749 | A | 7/1993 | Yenglin | |
| 5,238,145 | A | 8/1993 | Pippin | |
| 5,261,467 | A | 11/1993 | Yamamoto et al. | |
| 5,273,183 | A | 12/1993 | Tuttobene | |
| 5,276,391 | A | 1/1994 | Jonsson | |
| 5,280,845 | A | 1/1994 | Leight | |
| 5,303,844 | A | 4/1994 | Muehlberger | |
| 5,344,043 | A | 9/1994 | Moulding et al. | |
| 5,346,466 | A | 9/1994 | Yerlikaya et al. | |
| 5,390,711 | A | 2/1995 | Murphey | |
| 5,490,610 | A | 2/1996 | Pearson | |
| 5,625,198 | A | 4/1997 | Chigira | |
| 5,651,479 | A | 7/1997 | Bates | |
| 5,769,269 | A | 6/1998 | Peters | |
| 5,803,320 | A * | 9/1998 | Cutting et al. | 222/641 |
| 5,813,568 | A | 9/1998 | Lowing | |
| 5,831,862 | A | 11/1998 | Hetrick et al. | |
| 5,847,389 | A | 12/1998 | Mertins et al. | |
| 5,884,806 | A | 3/1999 | Boyer et al. | |
| 5,927,539 | A | 7/1999 | Truitt et al. | |
| 5,992,030 | A | 11/1999 | Mann | |
| 6,064,921 | A | 5/2000 | Pippin et al. | |
| 6,098,524 | A * | 8/2000 | Reese | 99/280 |
| 6,100,518 | A * | 8/2000 | Miller | 250/222.1 |
| 6,202,888 | B1 | 3/2001 | Pollock et al. | |
| 6,269,285 | B1 | 7/2001 | Mignault | |
| 6,324,520 | B1 | 11/2001 | Walker et al. | |
| 6,330,958 | B1 | 12/2001 | Ruskin et al. | |
| 6,354,716 | B1 | 3/2002 | Chen et al. | |
| 6,384,402 | B1 | 5/2002 | Hair, III et al. | |
| 6,422,422 | B1 * | 7/2002 | Forbes | 222/66 |
| 6,478,187 | B2 | 11/2002 | Simson et al. | |
| 6,540,102 | B2 | 4/2003 | Gates et al. | |
| 6,578,763 | B1 * | 6/2003 | Brown | 235/435 |
| 6,640,994 | B2 | 11/2003 | Chen | |
| 6,675,985 | B2 * | 1/2004 | Sato et al. | 221/96 |
| 2001/0000408 | A1 | 4/2001 | Hair, III et al. | |
| 2001/0000610 | A1 | 5/2001 | Johnson | |
| 2002/0117509 | A1 * | 8/2002 | Whitten et al. | 221/9 |
| 2002/0179620 | A1 | 12/2002 | Mason, II | |
| 2002/0195458 | A1 | 12/2002 | Whitten et al. | |
| 2003/0084959 | A1 | 5/2003 | Hartnell et al. | |
| 2003/0155367 | A1 | 8/2003 | Chen | |

FOREIGN PATENT DOCUMENTS

| | | |
|---|---|---|
| EP | 0 053 489 | 6/1982 |
| EP | 0 432 996 A1 | 6/1991 |
| EP | 0 535 856 | 4/1993 |
| EP | 0 462 591 | 5/1996 |
| JP | 02-257386 | 10/1990 |
| JP | 09-326075 | 12/1997 |
| WO | WO 99/56255 | 11/1999 |

* cited by examiner

APPARATUS AND METHODOLOGY OF DETECTING FULFILLMENT OF CUSTOMER VEND REQUEST

CROSS-REFERENCE TO RELATED APPLICATION

This application claims the benefit of and incorporates by reference U.S. Provisional Patent Application Ser. No. 60/335,329 entitled "APPARATUS AND METHODOLOGY OF DETECTING FULFILLMENT OF CUSTOMER VEND REQUEST" filed on Oct. 24, 2001.

TECHNICAL FIELD OF THE INVENTION

The present invention relates to the vending arts generally and more specifically to beverage vending machine delivery systems for determining whether a beverage product has been delivered to the consumer after a customer order.

BACKGROUND OF THE INVENTION

Currently, beverage vending machines lack the ability to detect and confirm whether an ordered product has been actually delivered to a customer after an ordered vend event by the customer has occurred. Present methods, referred herein as the home switch method, always assume that the ordered product is available for delivery and that the product is successfully delivered upon completing one vend cycle.

However, vending machines often fail to deliver the product after the vend cycle for various reasons, including improper installation of the dry beverage mix or cups. Other reasons include improper service by the vendor's sales representative or obstructions in the delivery path. Thus, after paying for the product and completion of a vend cycle, the customer may fail to receive their ordered product. This results in customer frustration with the vending company, ultimately affecting customer relations and vending sales.

It is important that users, upon making requisite payment, be reliably vended the product which they have selected, without any deficiency or bonus, and without any need or apparent desirability for expending unusual effort, or that the user automatically be provided a return of payment, or the opportunity to make another selection.

SUMMARY OF THE INVENTION

The present invention provides a vending system that verifies the delivery of a ordered beverage product. To accomplish this, the present invention uses a product delivery system that monitors a beverage product's container or cup from storage through delivery and to a receiving position. A sensor located along the delivery path senses when the container or cup passes during transition through the delivery path from the storage position to the receiving position. Reporting circuitry, electronically coupled to the sensor and its associated sensing circuitry, reports to the product delivery system when the product has passed the sensor.

Additionally, another embodiment of the present invention provides a method of determining whether a product has been delivered. This method first sends a delivery signal based on a customer ordering event to a beverage product delivery system. The delivery path along which the product travels to reach the product receiving location is monitored to determine if the product was delivered to the receiving space.

The present invention provides an advantage over existing systems in that the present invention provides an optical vend-sensing system which detects vended beverage containers which are of various sizes and shapes.

Additionally, the present invention provides another technical advantage by providing an optical vend-sensing system robust against background noise and stray signals and against intentional attempts to disrupt the detection system.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

The present invention provides an apparatus and methodology to monitor the provisioning of a beverage vend request from a beverage vending machine that dispenses freshly made beverages.

The present invention for beverage vending units assures that a cup is available at the cup station prior to collecting any funds or delivering any product. A sensing or monitoring system in one embodiment utilizes an infrared beam of light across the cup station that the cup breaks when in position. This system provides a more reliable process than present mug sensors that use a reflected beam of infrared light that has different sensitivities to light and dark surfaces. The present invention allows for a version of the new sensor electronics that are small, easy to mount, and self-adjusting. Additionally, the present invention can easily detect clear plastic cups as well as conventional paper cups.

Software associated with the present invention monitors the delivery area sensor during the time the cup ring is cycled and a predetermined amount of time afterwards. In one embodiment this period of time is three seconds. If a cup is not detected, the software will determine if an additional cup ring with the same size cups exists and attempt to drop a cup from the additional ring. If the additional ring also fails to drop a cup or is not able to be used, the software will repeat the attempt from the first cup ring. Furthermore, the software will attempt to clear any jams in the cup delivery area. Each ring may be tried up to two times. If the cup is still not detected, then any ring that failed a predetermined number of times, such as twice in a row, is removed from service or placed "out-of-service" for a programmable time (see "AJP.TMR" below). Additionally, the customer's credit is either restored for another vend attempt or is returned automatically ("FAIL=CRDT" or "FAIL=CASH" setup). In the event other size cups may be available, a signal, audible or visual, informs the customer to choose a different size. For example, three beeps may be sounded with the message "SELECT ANOTHER SIZE"[1] flashes if another size cup ring is available. Alternatively the message "INSERT MUG" may be flashed in the unlikely event that no other cups are available. This ensures that customer always receives their money back if they desire by pressing the coin return button.

Special rules exist to protect both the customer and the operator from loss. First and foremost, the present invention protects the customer since no beverage spoils, nor is any money lost, because a cup fails to fall to the cup station. The customer has every chance to receive their original choice of cup size by trying at least twice per ring to eject a cup. If multiple rings are available with the same cup size, the system will alternately try to vend a cup from each ring until the cup is delivered or every ring is placed "out-of-service".

Figure 1:
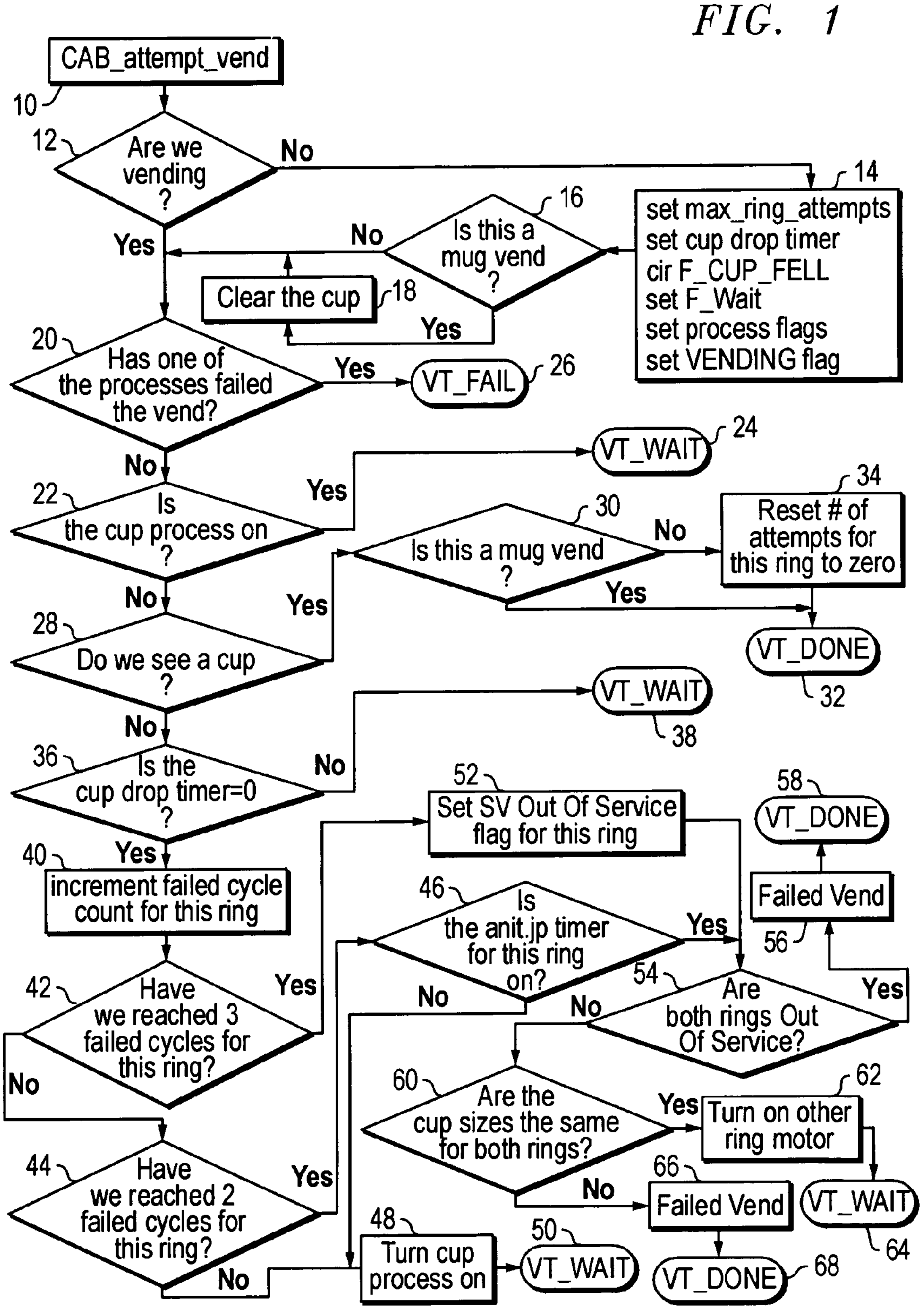
FIG. 1 illustrates, in flow chart form, one embodiment of the present invention.

FIG. 1 provides a flow chart illustrating one embodiment of the present invention. In FIG. 1, after a customer orders a beverage from a beverage vending machine that contains the present invention, the vending machine's order control unit sends an "attempt vend" signal to the monitoring control unit in the vending machine in step 10.

Upon receiving an "attempt vend" signal, the present invention monitors the delivery system to determine if a vend event is in the process of provisioning the vend request at decision point 12. If it is not, then the monitoring control unit begins to monitor various "vend points" within the system to determine if a correctable fault has occurred such that the vending unit can complete the vend request or if the vend request results in a failed vend.

In order to determine where the fault lies, the unit resets in step 14 to a known state at the beginning of the vend process. This may involve resetting variables have corresponding fixed set points, which are compared against the variables. The set points are preset by service personnel during the initialization of the control unit during restocking of the beverage supplies or other maintenance or service operations that the service person effectuates on the vending machine. The variables and their associated set points are max ring attempts, cup drop timer, cup fell controller, cup waiting timeout, process flags, and vending flags, although other points within the delivery system may also be monitored or included in the monitored variables.

After resetting the variables, the monitoring system verifies that the vend request was for a beverage at decision point 16. If it is for a beverage, the monitoring system analyzes the cup pathway to determine whether the cup delivery area is clear in step 18. This check ensures the presence of a cup or mug in the delivery area to accept the hot beverage ordered by the customer, and prevents wastage of product by ensuring that the hot beverage is not dispensed without a receptacle in the delivery area.

When the customer request is a vend request for a beverage, the monitoring system monitors the system-wide components to determine if one of the processes needed to complete the vend has failed at decision point 20. If a vend delivery process has failed then the monitoring system sends a "failed vend" signal to the ordering system in step 20.

If no process has failed at decision point 20, then the monitoring system checks the cup dispersal process to ensure that it is turned on at decision point 22. If the cup dispersal process is turned on, then the monitoring system enters into a wait state in step 24. The wait state generally lasts until either a completed, successful beverage vend has occurred or until the monitoring system determines that a failed vend has occurred for other reasons.

If the cup process is not on at decision point 22, then the system compares the result from the cup sensing system to determine whether a cup is in the delivery area at decision point 28. If a cup is in the delivery area, then the system determines whether the vend request is a "mug" vend request, wherein the user provides a container for fulfillment of the beverage vend, at decision point 30. If the vend request is a mug vend request, then the monitoring system is complete and a signal is sent to the order processing area in step 32. If a cup is present in the delivery area and the vend request is not a mug vend request in decision point 30, then in step 34 the monitoring system resets the attempts for the cup vending ring to zero.

If, at decision point 28, the sensing system did not sense a cup in the delivery area, then the machine waits until the "time out" variable times out at decision point 36. If it has not timed out, then the monitoring system waits at step 38, until the machine has timed out.

Once the wait cycle has timed out at decision point 36, then the "failed cycle" variable associated with the particular cup ring increases by one increment in step 40. Next, the monitoring system determines if a set number of failed cycles have occurred for the cup ring that is attempting to fulfill the order at decision point 42. For example, if three cycle attempts have not occurred, then at step 44 the monitoring system determines if two cycle attempts have occurred.

If three cycle attempts have not occurred, then in step 48 the monitoring system engages the cup process on, which will cycle the ring delivery system to attempt another cup delivery. After the second attempt in step 48, the monitoring system waits for either a confirmation of a cup delivery from the scanning or monitoring system to time out in step 50.

If the system has made two attempts to deliver a cup, then decision point 46 determines whether the anti-jackpot timer is on for this cup ring. If the anti-jackpot timer is on, then that ring is placed out of service for a preset amount of time. The anti-jackpot program of the system protects the operator. The protection prevents an unscrupulous customer from stopping cups from reaching the sensing area of the cup station in order to steal the cups and then get his money back for the vend.

With the present invention's anti-jackpot system, the operator can lose no more than two cups in a row per ring. Then the ring is temporarily placed out-of-service both to protect the customer and to discourage the thief. The amount of time that the cup ring is out-of-service is programmed under the PRODUCT CONFIG service mode at the display "AJP.TMR xxM". Any time from "00" to "99" minutes can be programmed. After the allotted time has elapsed, the cup ring will return to service but the count of the two failures is kept.

If the previous problem was a thief, then the next vend attempt from that ring will be successful and the count of the two previous failures will be erased. If the problem is an actual system failure, then the third failure will permanently place that cup ring out of service until a serviceman visits the machine. The error will be displayed in the DIAGNOSTICS list as "SV.ERR CUPx" where "x" is "1" or "2" corresponding to cup ring 1 or 2.

If three cycle attempts have occurred for the particular ring, then in step 52 the monitoring system notates that ring as "out of service" until the ring's variable is reset during a service call. After notating the ring as "out of service," the monitoring system determines whether both rings are out of service at decision point 54. If both rings are in an out-of-service state, then in step 56 a "failed vend" signal is sent by the monitoring system to the order system, and the monitoring system terminates the attempted vend in step 58, whereupon the ordering system will offer different alternatives to the customer depending on the logic system's variables as set during the service call.

If both rings are not out-of-service at decision point 54, then the system determines whether the second ring has cups that are suitable for filling the vend order at decision point 60. If the second ring does not have suitable cups, then in step 66 the monitoring system sends the "failed vend" signal to the ordering system, and in step 68 the monitoring system sends a complete signal as in step 58.

If the cups in the second ring are suitable for filling the vend request, then in step 62 the delivery system sends a vend signal to the second ring, which turns on the second ring's motor to deliver the cup from the second ring. Once the delivery system has attempted to use the second ring to deliver the cup, then the monitoring system monitors the fulfillment process as described above.

Figure 2:
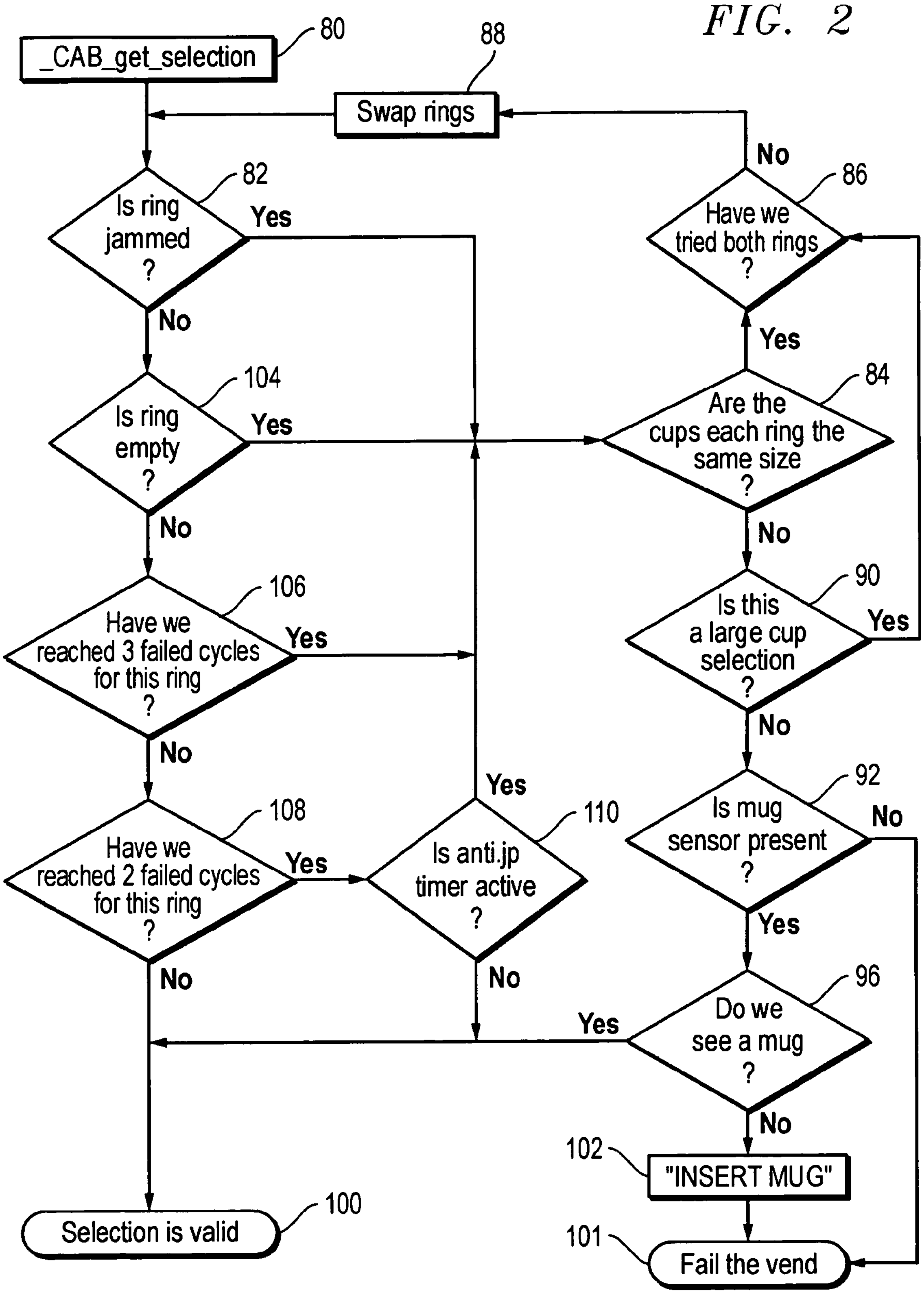
FIG. 2 illustrates, in logic flow chart form, the monitoring system methodology for determining whether a vend attempt is fulfilled.

FIG. 2 provides a logic flow chart illustrating the monitoring system methodology for determining whether a vend attempt is fulfilled. In step 80, the monitoring system receives a selection request from the ordering system activating cup delivery monitoring system. Upon receiving a select request notification, the monitoring system determines whether a cup ring is jammed at decision point 82. If a cup ring is jammed, then at decision point 84 the monitoring system determines whether the second ring's cups are suitable to fulfill the vend request. If the second ring cups are suitable, the monitoring system determines whether the system has attempted to utilize the second ring as a method to fulfill the vend request at decision point 86. If not, then the system will swap rings in step 88 in an attempt to fulfill the order.

If the cups on the second ring are not suitable for fulfilling the vend request, then the system determines whether the vend request was for a large cup at decision point 90. If so, then the monitoring system attempts to utilize the second ring if no previous attempt has been made as was determined at decision point 86. If the vend request is not for a large cup, then the system determines if the mug sensor is present in step 92. If the mug sensor is not present, then the monitoring system sends a "failed vend" signal to the ordering system in step 94. If the mug sensor is present, then the system determines if a mug is present in the delivery area at decision point 96. If a mug sensor is present in the delivery area, then the system allows the alternative selection to be made in step 100. If a mug is not present, then an "insert mug" signal is sent to the communication system so that the display is presented to the customer requesting them to insert a mug in step, 102.

If the ring is not jammed at decision point 82, then the monitoring system determines if the ring is empty at decision point 104. If the ring is not empty, then the system determines if the monitoring system has attempted a predetermined number of attempts to vend the cup into the delivery area at decision point 106. Typically, the system will monitor for three attempts; however, those skilled in the art will recognize that other numbers of attempts may be used.

If the system has not reached the predetermined number of attempts at decision point 106, then the system determines if the cup delivery system has failed in two attempts in delivery for that ring at decision point 108. If the system has attempted two failed attempts, then the monitoring system determines if the anti-jackpot timer is active at point 110. If the timer is not active, then the system turns the cup process on and attempts to deliver the cups a third time.

If a cup ring is out of service, the present invention may alter a vend from a selected large cup to a small cup at the small cup price. An induced failure cannot cause an alternate vend from a selected small cup to a large cup at the small cup price. The present invention can be turned off for any reason under the PRODUCT CONFIG screen "SURE.V ON" or "SURE.V OFF".

Figure 3:
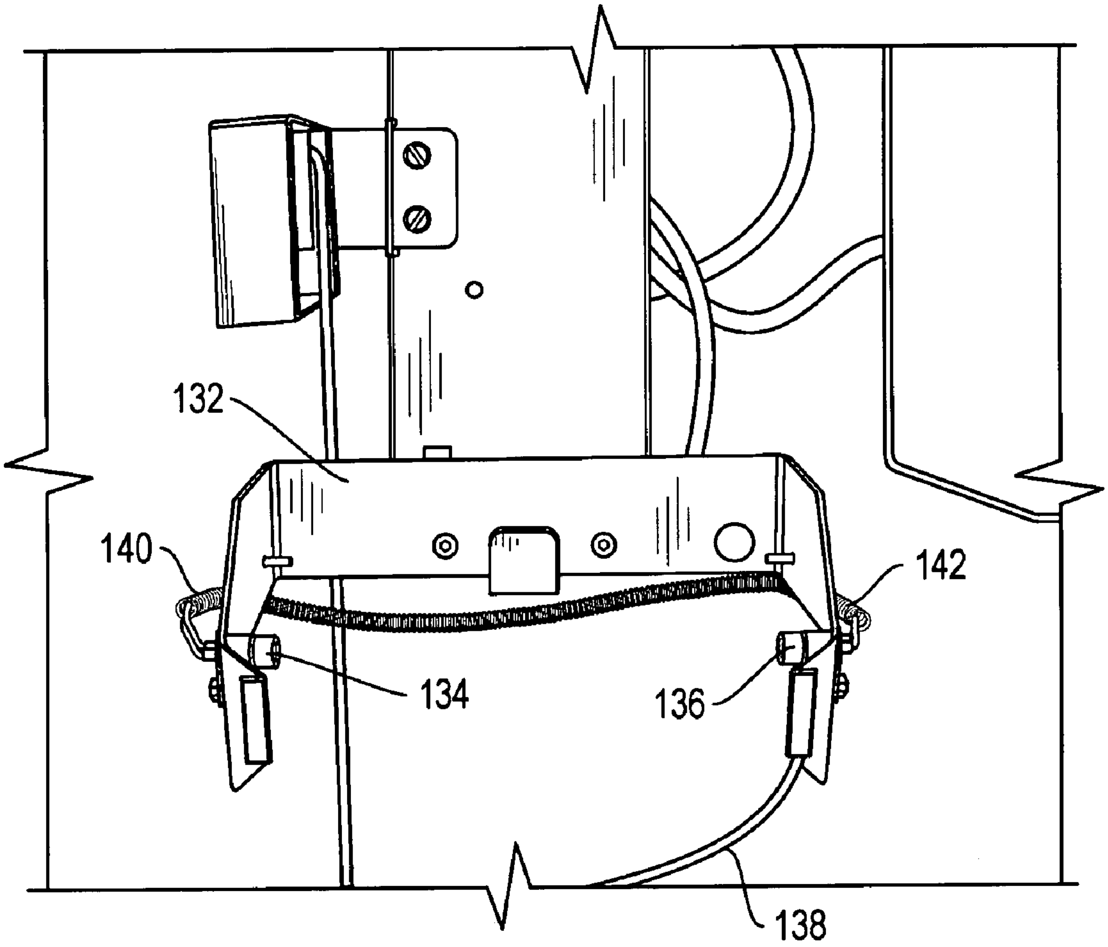
FIG. 3 illustrates the basic elements of the present invention in a vending machine.

FIG. 3 illustrates the basic elements of the present invention in vending machine 140. In FIG. 3, retaining bracket 132 secures the scanning elements of the present invention. The scanning elements include a light emitting element 134 and a light detecting element 136. The light emitting element sends a beam of light, usually infra-red light, across the delivery area 138. Electrical connections 140 and 142 transfer the electrical signal from the controlling units located (for the light emitting element) and from the electrical element upon detection to the controlling unit within the beverage vending machine.

Figure 4A:
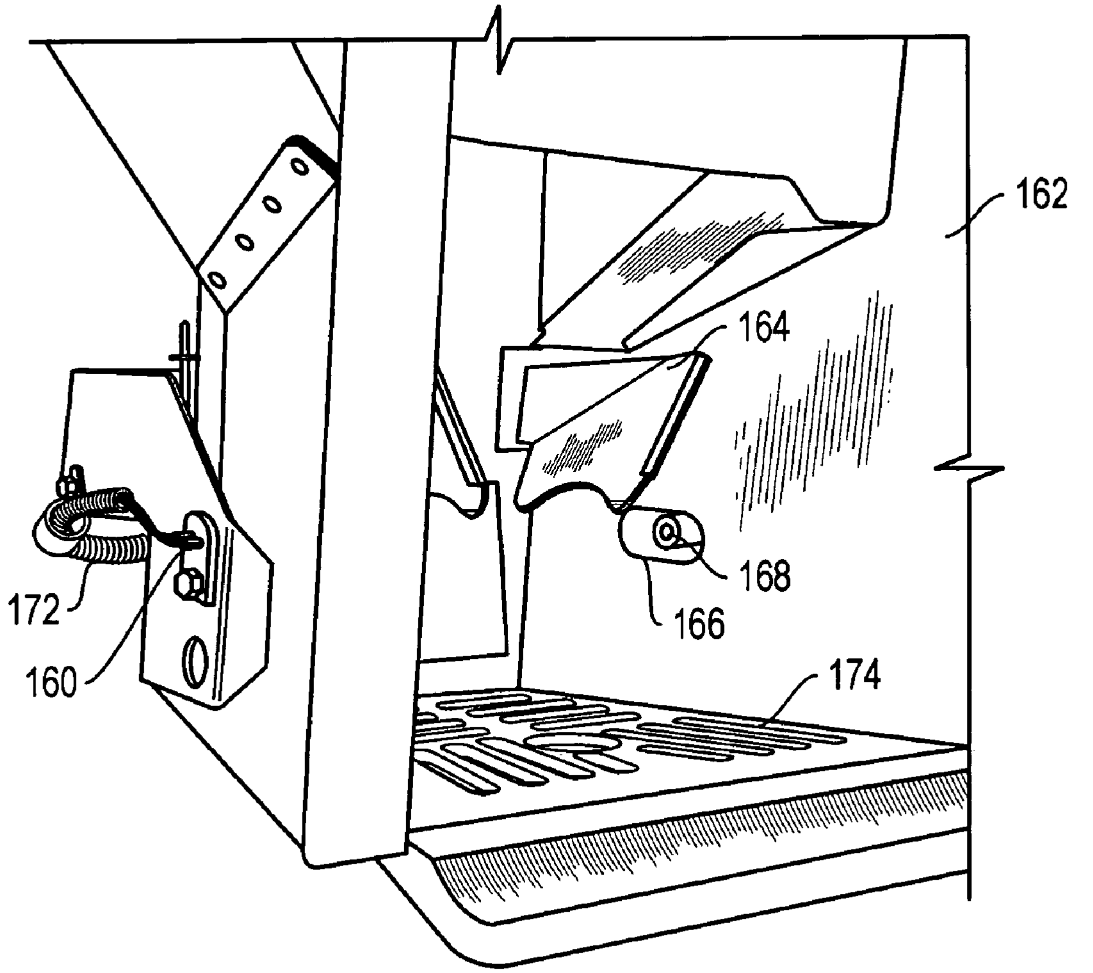
FIG. 4A illustrates the scanning unit positioned in a beverage vending unit.

FIG. 4A illustrates the scanning unit positioned in a beverage vending unit. FIG. 4A shows the light detector 160 positioned in vending delivery area 162 to scan the cup dispensing path 164. Opening 166 allows detecting unit 168 to receive the light from light emitting element 168. When a cup proceeds down the delivery path, the cup passes through the delivery area 164 and breaks the light path, thus causing light detecting element 168 to return a "detect" signal to the monitoring system. Electrical cable 172 is provided to send electrical signals to light detecting element 168. A similar electrical cable connects light detecting element 168 to the vending machines scanning system. Drain 174 allows any beverage that spills during vending fulfillment to be carried away from the delivery area. Bracket 176 holds the scanning elements secure to the delivery area.

Figure 4B:
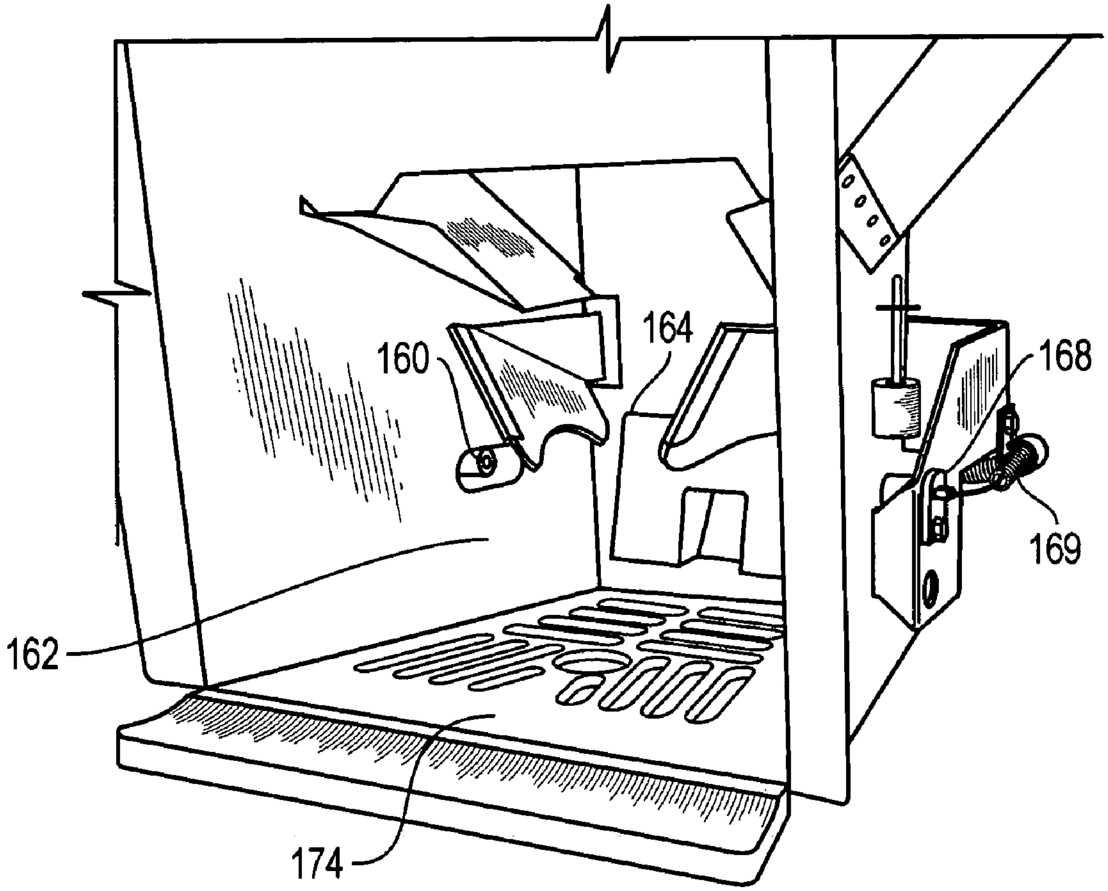
FIG. 4B shows the detecting element cable attached to the detecting element.
Figure 5:
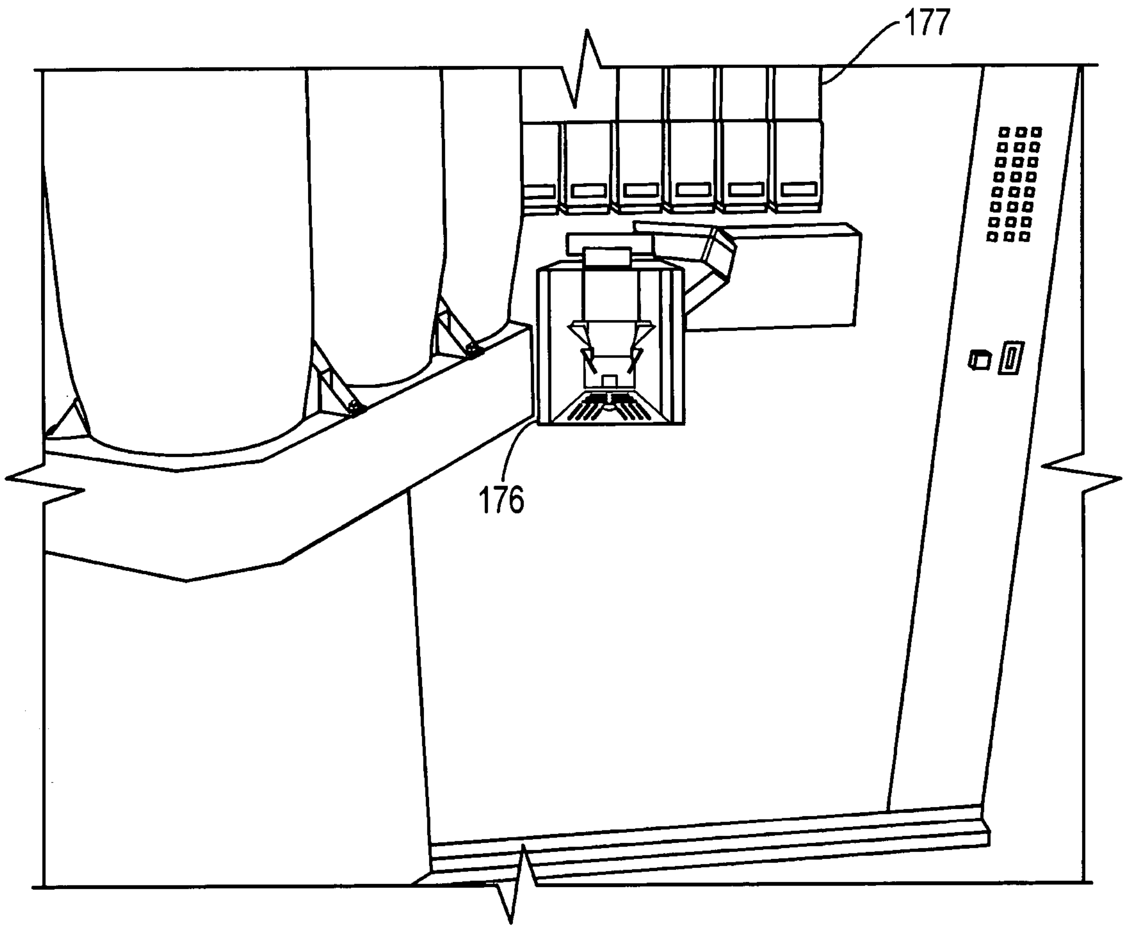
FIG. 5 shows the present invention installed in a beverage dispensing unit.

FIG. 4B illustrates the scanning unit from a different angle positioned in a beverage vending unit. FIG. 4B shows the detecting element cable 169 attached to the detecting element 168. FIG. 5 shows the present invention 175 installed in a beverage dispensing unit 177.

Figure 6:
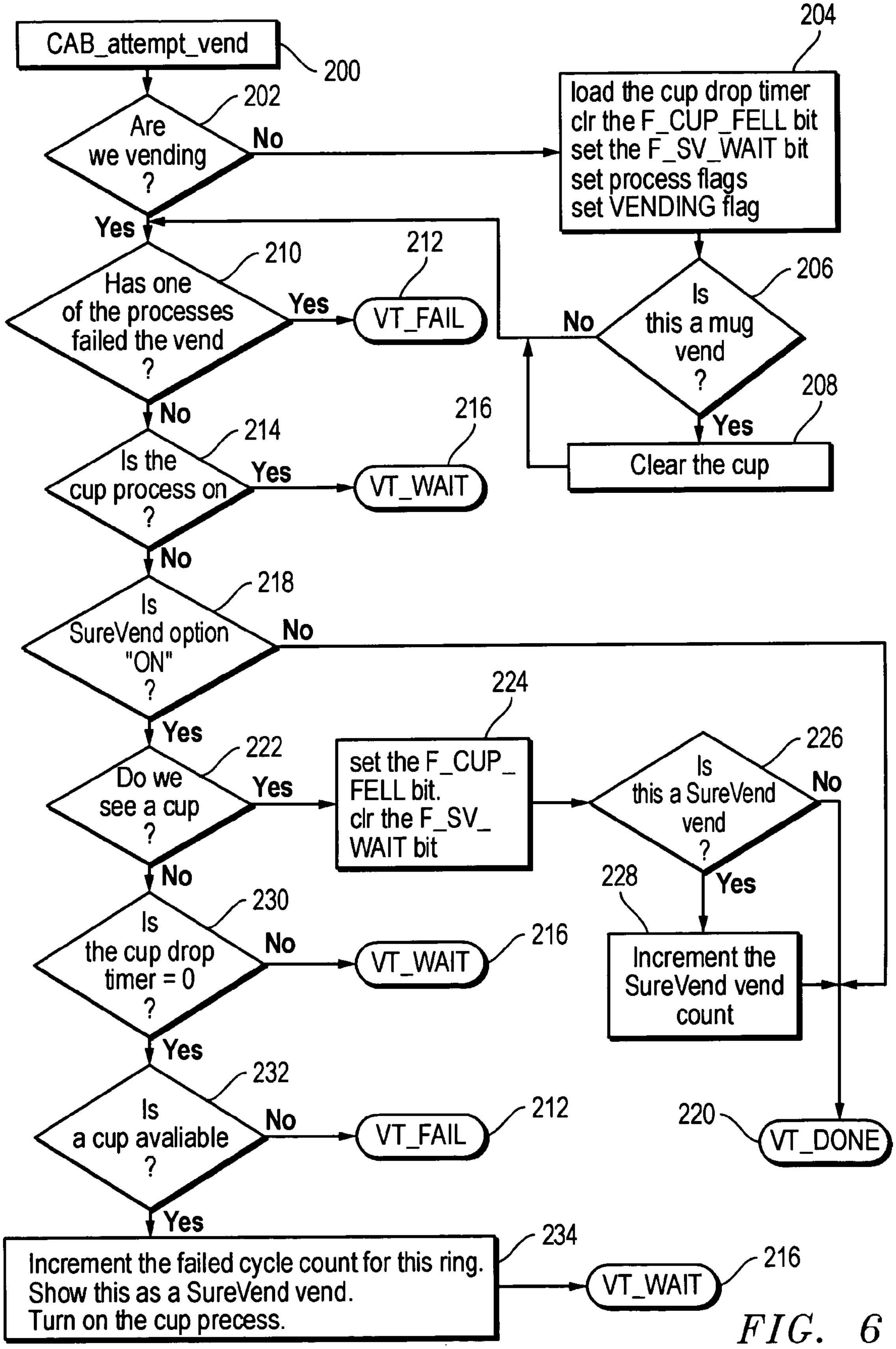
FIG. 6 illustrates, in flow chart form, another embodiment of the present invention.

FIG. 6 provides a flow chart depicting yet another embodiment of the present invention. Those skilled in the art will understand that different methodologies may be utilized including monitoring to ensure that the scanning system in activated.

In FIG. 6, after a customer orders a beverage from a beverage vending machine that contains the present invention, the vending machines order control unit sends an attempt vend signal in step 200. Upon receiving an attempt vend signal, a delivery system monitors to determine if a vend is in the process of provisioning the vend request at decision point 202. If not, then monitoring circuitry determines if a correctable fault has occurred such that the vending unit can complete the vend request, or if the vend request results in a failed vend in step 204. As part of this process, at decision point 206, a determination is made as to whether nor not this is a mug vend. If it is a mug vend, the cup is cleared at step 208. If not, a determination is made at decision point 210 as to whether or not one of the processes has failed to vend. If one of the processes has been determined to have failed the vend, a "VT Fail" message is sent at step 212. If one of the processes has not failed at decision point 210, an examination is made to determine whether or not the cup process is on at decision point 212. If the cup process is on, a "VT Wait" message is sent at step 216. If the cup process is not on at decision point 214, a determination is made at decision point 218 as to whether or not the sure vend option is "on". If the sure vend option is not "on", then the process is done at step 220. If the sure vend option is "on" at decision point 218, then a determination is made as to whether or no't a cup is detected at decision point 222. If a cup is present, then the cup fall bit is set and the wait message is cleared at step 224. Then, a determination is made at decision point 226 as to whether or not this is a sure vend. If not, the vend is complete at step 220. If the vend is a sure vend, then the sure vend count is incremented in step 228 prior to completing the vend at step 220. If there is not a cup present at decision point 222, a determination is made as to whether or not the cup drop timer is equal to zero at decision point 230. If the cup drop time is not equal to zero, a "VT Wait" message is sent, as previously encountered at step 216. If the cup drop timer is equal to zero at decision point 230, then a determination is made as to whether or not a cup is available at decision point 232. If no cup is available, then the vend failed, as was previously encountered at step 212. Otherwise, at step 234 the failed cycle count for a particular cup ring is incremented and this is recorded as a sure vend event, followed by a wait, as was previously encountered at step 216.

Figure 7:
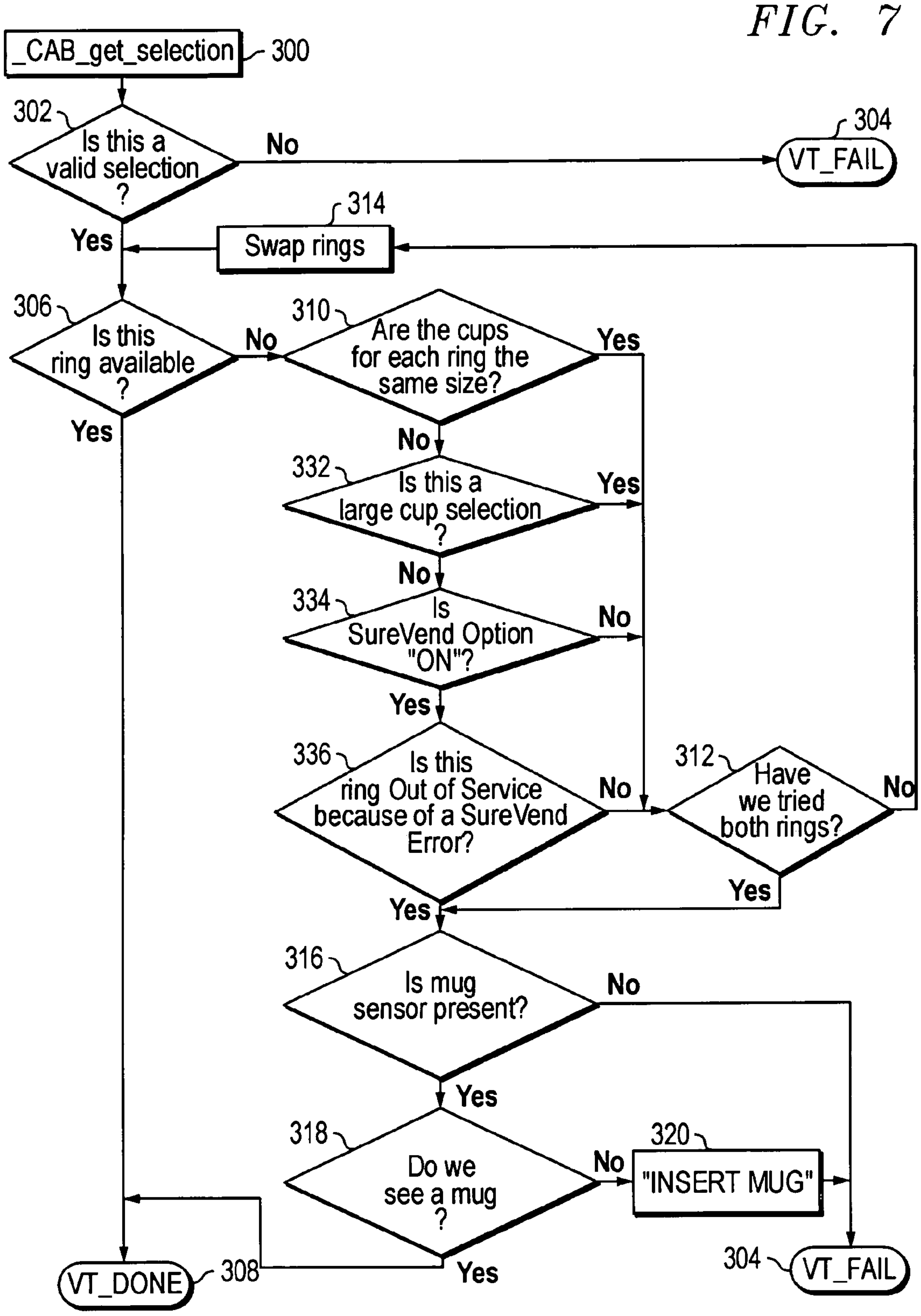
FIG. 7 illustrates, in flow chart form, another embodiment of the present invention.

FIG. 7 provides another flow chart illustrating yet another embodiment of the present invention. This flow chart illustrates the selection validation logic of a sure-vend on process. In this flow chart, a selection is received at step 300. At decision point 302 a determination is made as to whether or not this is a valid selection. If it not a valid selection, the vend fails at step 304. If it is a valid selection, then a determination is made as to whether or not a cup ring is available at decision point 306. If there is a cup ring available, then this process is complete at step 308. If not, a determination is made at decision point 310 as to whether or not additional cup rings of the same size are available. If cups of the same size are available, a determination is made at decision point 312 as to whether or not these alternate cup rings have been tried. If these alternate cup rings have not been tried, the cup rings are alternated in step 314 and the process returns to decision point 306 with this new alternate cup ring. If the alternate cup rings have all been tried at decision point 312, then a determination is made as to whether or not there is a mug sensor present at decision point 316. If no mug sensor is present, then the vend fails at step 304. However, if the mug sensor is present, a determination is made as to whether or not a mug is in fact present at decision point 318. If no mug is present, an audible or visual message is provided to a customer instructing the customer to insert a mug at step 320. If a mug is present at decision point 318, then the process is complete to step 308.

Returning to decision point 310, if there is not an alternate cup ring of the same size available, a determination is made as to whether or not this is a large cup selection at decision point 322. If this is a large cup selection, the process is directed again to decision point 312. However, if this is not a large cup selection at decision point 332, a determination is made as to whether or not the mug option is on at decision point 334. If the mug option is not on, the process returns to decision point 312 as previously described. However, if the mug option is on at decision point 334, a determination is made as to whether or not the ring in question is out of service because of a vend error at decision point 336. If the ring is out of service due to a vend error, then the process returns to decision point 312. Otherwise, an evaluation is made as to whether nor not a mug sensor is present at decision point 316.

Figure 8:
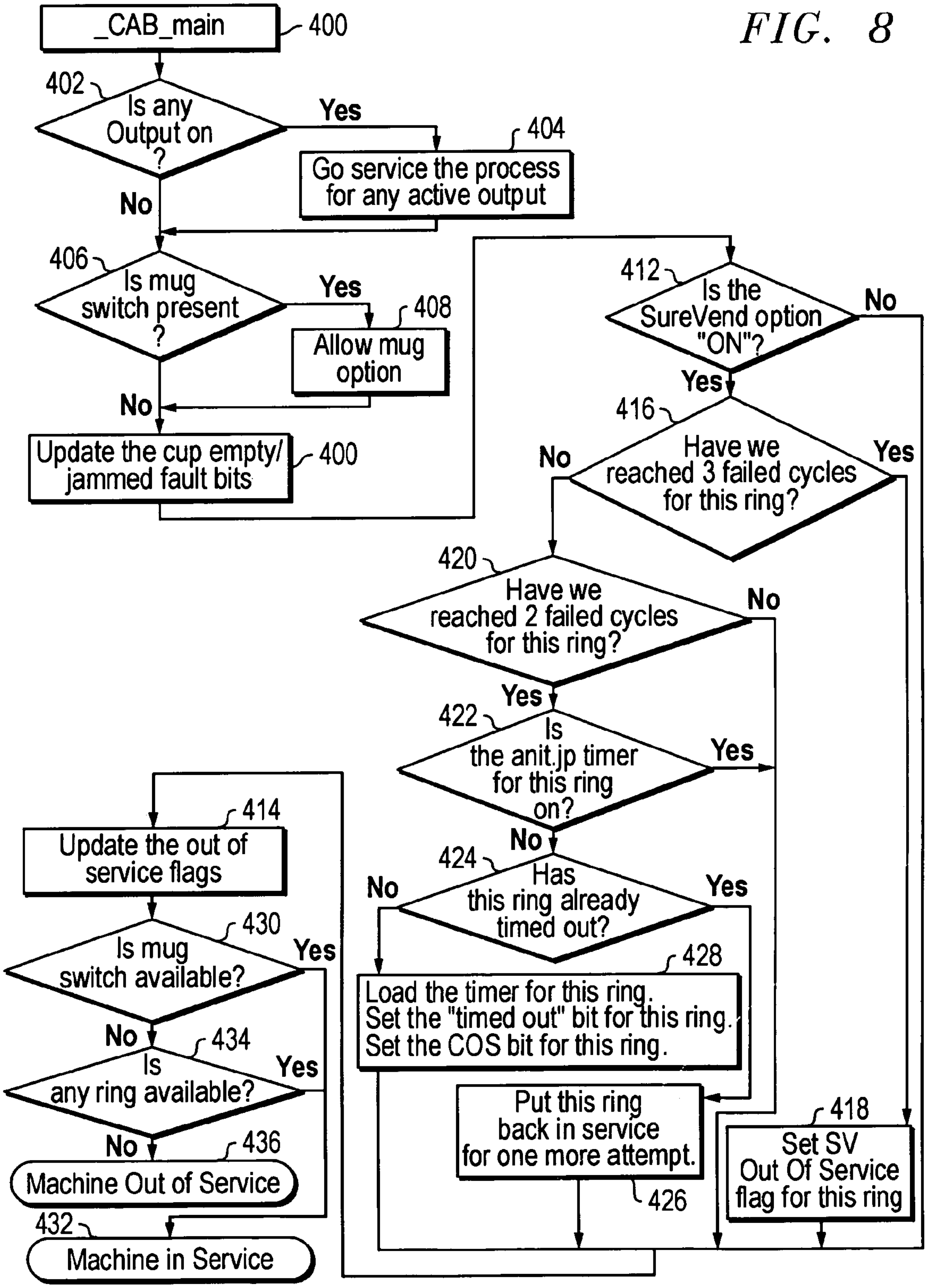
FIG. 8 illustrates, in flow chart form, another embodiment of the present invention.

FIG. 8 provides a flow chart that depicts yet another embodiment of the-present invention. FIG. 8 shows the idle or monitoring state of the present invention. The idle or monitoring state operates to monitor the state of the beverage delivery system and to ensure that a proper delivery of product is provided to the customer or that the customer receives either an alternative choice or a refund if the delivery system fails to operate as designed.

Beginning at step 400 an evaluation is made at decision point 402 as to whether or not any output is present. If an output is present at decision point 402, the process for any active output is performed at step 404. If no output is present an evaluation is made as to whether or not a mug switch is present at decision point 406. If a mug switch is present at decision point 406, step 408 allows for the mug option. Otherwise, an update of the cup empty fault byte switch is made at step 410. At decision point 412 a determination is made as to whether or not the sure vend option is on. If the sure vend option is not on, an update of the out-of-service flag is made in step 414. However, if the sure vend option is on at decision point 412 a determination is made at decision point 416 as to whether or not a predetermined number of failed cycles for a given ring of cups has occurred. If this predetermined number of cycles has occurred, then an out-of-service flag for that particular cup ring is set at step 418. Otherwise, an evaluation is made as to whether or not a lesser number of failed cycles for a given cup ring has occurred in decision point 420. If the predetermined number of failed cycles has not been reached the out-of-service flag is updated at step 414. Otherwise, a determination is made as to whether or not there is an alternate ring available at decision point 422. If no alternate ring is available the cup ring in question is evaluated to determine whether or not it has previously timed out at decision point 424. If it has in fact timed out, then the ring will be put in service for an additional attempt at step 426. Otherwise, a timer is loaded for this individual cup ring and the timed out bit for this ring is set along with a flag for the out-of-service condition, indicating an out-of-service status for this particular cup ring in step 428.

Once the out-of-service flags have been updated in step 414 for the various cup rings, a determination is made as to whether or not a mug switch is available at decision point 430. If this mug switch is available, then the machine is allowed to continue in service at step 432. If not, a determination is made as to whether or not any ring is available at decision point 434. If a ring is available the machine continues in service. Otherwise, the machine is placed out of service at step 436.

In summary, the present invention provides for a vending system wherein a monitoring system verifies that a beverage product ordered by a vending customer is actually delivered through a delivery area to the customer. If the beverage product ordered is unavailable either because of an out-of-stock situation or a blockage of the delivery path for that product, the present invention allows the customer to request a refund or order a second product.

Although the present invention is described in detail, it should be understood that various changes, substitutions and alterations can be made hereto without departing from the spirit and scope of the invention as described by the appended claims.

What is claimed:

1. A beverage vending machine comprising:

a product delivery system;

a storage system for beverage containers;

a delivery path in which said beverage containers travel from said storage system to a receiving position to which beverage is dispensed and at which a customer is able to remove beverage containers;

a first sensor sensing presence of a beverage container at said receiving position by interruption of a light beam from an emitter across said receiving position to a detector by said beverage container while said beverage container is at said receiving position and independent of whether said beverage container was dispensed from said storage system;

reporting circuitry signaling when said beverage container is sensed by said sensor;

a beverage dispensing system that fills beverage containers at said receiving position and operatively controlled in response to sensing of said presence of said beverage container at said receiving position by said sensor; and a monitoring control unit, wherein said monitoring control unit determines if said beverage container reached said receiving position and allows a payment from a customer to said beverage vending machine to be refunded if said container does not reach said receiving position, wherein said monitoring control unit monitors variables to determine if a fault has occurred, wherein said variables comprise max ring attempts, cup drop timer, cup fell controller, cup waiting timeout, process flags, and vending flags.

2. The beverage vending machine of claim 1, wherein said storage system comprises a cup ring, wherein the beverage vending machine further comprises:

a second sensor located along said delivery path detecting passage of a beverage container from said storage system past the second sensor location to said receiving position.

3. The beverage vending machine of claim 1, wherein said first sensor senses beverage containers of differing sizes at said receiving position.

4. The beverage vending machine of claim 1, wherein said first sensor senses clear plastic beverage containers and paper beverage containers at said receiving position.

5. The beverage vending machine of claim 1, wherein said beverage container is a cup.

6. A beverage vending machine delivery system comprising:

a product delivery system;

a storage system for beverage containers;

a delivery path in which said beverage containers travel from said storage system to a receiving position to which beverage is dispensed and at which a customer is able to remove beverage containers;

a sensor sensing presence of a beverage container at said receiving position by interruption of a light beam from an emitter across said receiving position to a detector by said beverage container;

reporting circuitry reporting when said beverage container is sensed by said sensor;

a beverage dispensing system that fills beverage containers at said receiving position; and a monitoring control unit coupled to said reporting circuitry, wherein said monitoring control unit determines if said beverage container reached said receiving position and allows a payment from said customer to said beverage vending machine to be refunded if said container does not reach said receiving position, wherein if said monitoring control unit determines that no beverage container is located at said receiving position, then said monitoring control unit determines if a mug order where said customer provides said beverage container for fulfillment of a beverage vend has been received.

7. A method of determining whether a beverage container has been delivered, comprising:

receiving at a beverage vending machine an order from a customer to vend a beverage;

sending a delivery signal based on said order to a beverage product delivery system and a monitoring control unit;

monitoring a delivery path for passage of a beverage container from a storage location past the monitored location to a receiving location at which a customer is able to remove a dispensed beverage container or to provide a beverage container for receiving dispensed beverage;

monitoring said receiving location to determine if a beverage container is disposed at a receiving location, wherein presence of said beverage container at said receiving location is detected by interruption by said beverage container of a light beam from an emitter across said receiving location to a detector while said beverage container is at said receiving position and independent of whether said beverage container was dispensed from said storage location via said delivery path to said receiving location;

allowing a payment from said customer to said beverage vending machine to be refunded if said beverage container is not disposed at said receiving location; and delivering a beverage to said beverage container located at said receiving location after verifying that said beverage container is at said receiving location, wherein a monitoring control unit, upon receiving said order, monitors said product delivery system to determine if said order is in process and, if said order is not in process, begins to monitor various product delivery system points to determine if a fault has occurred, wherein said monitoring control unit determines if said order can be completed or said order results in a failed vend, wherein said monitoring control unit monitors variables to determine if a correctable fault has occurred, wherein said variables comprise max ring attempts, cup drop timer, cup fell controller, cup waiting timeout, process flags, and vending flags.

8. The method of claim 7, further comprising sensing placement of a beverage container at said receiving location by a customer.

9. The method of claim 8, wherein said beverage container is a cup.

10. The method of claim 7, wherein if said beverage container dispensed from said storage location has not been received at said receiving location, an operational status of said storage location is verified, and if said operational status of said storage location is not available, an alternate storage location is identified and placed in service.

11. The method of claim 10, wherein if said operational status is a wait status, said monitoring control unit waits for said wait status to clear.

12. The method of claim 7, further comprising monitoring said storage location and said delivery pathway for anti-jackpotting.

13. The method of claim 12, wherein anti-jackpotting comprises temporarily removing said beverage vending machine from service to protect said customer and to discourage theft.

14. The method of claim 13, wherein an amount of time that said beverage vending machine is removed from service is programmed by an operator.

15. A method of determining whether a beverage container has been delivered, comprising:

receiving at a beverage vending machine an order from a customer to vend a beverage;

sending a delivery signal based on said order to a beverage product delivery system and a monitoring control unit;

attempting to deliver a beverage container from a storage location via a delivery path to a receiving location to which beverage is dispensed and at which a customer is able to remove a dispensed beverage container or to provide a beverage container for receiving dispensed beverage;

monitoring said receiving location to determine if a beverage container reached said receiving location, wherein presence of said beverage container at said receiving location is detected by interruption by said beverage container of a light beam from an emitter across said receiving location to a detector;

allowing a payment from said customer to said beverage vending machine to be refunded if said beverage container does not reach said receiving location; and delivering a beverage to said beverage container located at said receiving location after verifying that said beverage container is at said receiving location, wherein a monitoring control unit, upon receiving said order, monitors said product delivery system to determine if said order is in process and, if said order is not in process, begins to monitor various product delivery system points to determine if a fault has occurred, wherein said monitoring control unit determines if said order can be completed or if said order results in a failed vend, and wherein if said monitoring control unit determines that no beverage container is located at said receiving location, said monitoring control unit determines whether or not said order is a mug order wherein said customer provides said beverage container for fulfillment of said order.

16. A method of determining whether a beverage container has been delivered, comprising:

receiving at a beverage vending machine an order from a customer to vend a beverage;

sending a delivery signal based on said order to a beverage product delivery system and a monitoring control unit;

attempting to deliver a beverage container from a storage location to a receiving location via a delivery path, wherein beverage is dispensed to beverage containers at said receiving location and customers are able to remove dispensed beverage containers from said receiving location or to provide beverage containers at said receiving location for receiving dispensed beverage;

monitoring said delivery path at a location other than said receiving location for passage of said beverage container along said delivery path from said storage location to said receiving location;

monitoring said receiving location to determine if said beverage container reached said receiving location, wherein if a monitoring control unit determines that said beverage container has not been delivered from said storage location, said monitoring control unit increments a variable associated with said storage location, wherein said variable indicates a number of failed cycles;

allowing a payment from said customer to said beverage vending machine to be refunded if said beverage container does not reach said receiving location; and delivering a beverage to said beverage container located at said receiving location after verifying that said beverage container is at said receiving location.

17. The method of claim 16, wherein said storage location is removed from service after reaching a predetermined number of failed cycles.

18. The method of claim 17, wherein said predetermined number is three.

19. A beverage vending machine, comprising:

a storage system comprising a plurality of cup rings with same size cups, said storage system selectively attempting to deliver cups from one of said cup rings to a receiving position;

a first sensor sensing passage of a cup from one of said cup ring past the first sensor to said receiving position;

a second sensor sensing presence of a cup at said receiving position; and a monitoring unit receiving a first signal generated by said first sensor and a second signal generated by said second sensor, wherein, if an attempt to deliver a cup from said one of said cup rings to said receiving position fails to deliver a cup to said receiving position, said storage system attempts to deliver a cup from an alternate one of said cup rings to said receiving position.

20. The beverage vending machine of claim 19, wherein if said attempt to deliver said cup from said alternate one of said cup rings to said receiving position fails, said storage system repeats said attempt to deliver a cup from said one of said cup rings to said receiving position.

21. The beverage vending machine of claim 20, wherein, upon failure of a predetermined number of attempts to deliver a cup from any of said cup rings to said receiving position, a respective cup ring is removed from service.

* * * * *